United States Patent
Adachi et al.

(10) Patent No.: US 10,775,767 B2
(45) Date of Patent: Sep. 15, 2020

(54) MACHINING SYSTEM

(71) Applicant: FANUC CORPORATION, Yamanashi (JP)

(72) Inventors: Hideaki Adachi, Yamanashi-ken (JP); Yasuhiko Kurosumi, Yamanashi-ken (JP); Yoshihiko Tarui, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/363,223

(22) Filed: Mar. 25, 2019

(65) Prior Publication Data
US 2019/0294139 A1  Sep. 26, 2019

(30) Foreign Application Priority Data

Mar. 26, 2018 (JP) .................. 2018-057823

(51) Int. Cl.
*B23Q 15/28* (2006.01)
*B25J 9/16* (2006.01)
*G05B 19/19* (2006.01)
*G05B 19/404* (2006.01)

(52) U.S. Cl.
CPC ........... *G05B 19/404* (2013.01); *B23Q 15/28* (2013.01); *B25J 9/1697* (2013.01); *G05B 19/19* (2013.01)

(58) Field of Classification Search
CPC ........ B23Q 15/28; B25J 9/1697; G05B 19/19; G05B 19/404; G05B 19/4065; G05B 2219/37212; G05B 2219/37559
See application file for complete search history.

(56) References Cited

U.S. PATENT DOCUMENTS

| | | | | |
|---|---|---|---|---|
| 5,361,308 A | * | 11/1994 | Lee | G01B 11/2441 348/131 |
| 5,796,618 A | * | 8/1998 | Maeda | G05B 19/4097 700/104 |
| 6,161,055 A | * | 12/2000 | Pryor | G05B 19/4065 382/152 |

(Continued)

FOREIGN PATENT DOCUMENTS

| | | |
|---|---|---|
| JP | H03269207 A | 11/1991 |
| JP | H06221829 A | 8/1994 |

(Continued)

OTHER PUBLICATIONS

English Machine Translation for Japanese Publication No. JPH03-269207A, published Nov. 29, 1991, 7 pgs.

(Continued)

*Primary Examiner* — Abdelmoniem I Elamin
(74) *Attorney, Agent, or Firm* — Fredrikson & Byron, P.A.

(57) ABSTRACT

A machining system includes a machine tool having a camera, and a three-dimensional shape generating apparatus. The three-dimensional shape generating apparatus includes an image capture unit that captures a first image from the camera at a first relative position and captures a second image from the camera at a second relative position, and a shape generator that generates a three-dimensional shape of at least one subject, based on the first image, the second image and a distance between the first relative position and the second relative position.

13 Claims, 12 Drawing Sheets

(56) References Cited

U.S. PATENT DOCUMENTS

| | | | |
|---|---|---|---|
| 6,584,415 B1* | 6/2003 | Uneme | G05B 19/4065 702/33 |
| 8,355,813 B2* | 1/2013 | Mori | G05B 19/406 700/160 |
| 10,391,601 B2* | 8/2019 | Jung | G01D 5/02 |
| 2009/0015668 A1 | 1/2009 | Tian et al. | |
| 2015/0051728 A1* | 2/2015 | Kim | G05B 19/4061 700/175 |
| 2016/0124422 A1 | 5/2016 | Matsukawa et al. | |

FOREIGN PATENT DOCUMENTS

| | | | |
|---|---|---|---|
| JP | 2008203214 A | 9/2008 | |
| JP | 2014087882 A | 5/2014 | |
| JP | 2015197374 A | 11/2015 | |
| JP | 201691142 A | 5/2016 | |
| JP | 2016110210 A | 6/2016 | |
| JP | 2017173032 A | 9/2017 | |
| WO | 2008026722 A1 | 3/2008 | |

OTHER PUBLICATIONS

English Machine Translation for Japanese Publication No. JPH06-221829A, published Aug. 12, 1994, 8 pgs.

English Machine Translation for International Publication No. WO2008/026722A1, published Mar. 6, 2008, 8 pgs.

English Machine Translation for Japanese Publication No. JP2014-087882A, published May 15, 2014, 12 pgs.

English Machine Translation for Japanese Publication No. JP2015-197374A, published Nov. 9, 2015, 15 pgs.

English Machine Translation for Japanese Publication No. JP2016-110210A, published Jun. 20, 2016, 25 pgs.

English Machine Translation for Japanese Publication No. JP2017-173032A, published Sep. 28, 2017, 15 pgs.

English Machine Translation of Decision to Grant a Patent mailed by Japan Patent Office (JPO) for Application No. JP2018-057823, dated May 24, 2020, 2 pages.

Untranslated Decision to Grant a Patent mailed by Japan Patent Office (JPO) for Application No. JP2018-057823, dated Mar. 24, 2020, 3 pages.

English Machine Translation of Notification of Reasons for Refusal mailed by Japan Patent Office (JPO) for Application No. JP2018-057823, dated Feb. 25, 2020, 3 pages.

Untranslated Notification of Reasons for Refusal mailed by Japan Patent Office (JPO) for Application No. JP2018-057823, dated Feb. 25, 2020, 3 pages.

English Abstract afor Japanese Publication No. 2016-091142 A, published May 23, 2016, 2 pgs.

English Abstract and Machine Translation for Japanese Publication No. 2008-203214 A, published Sep. 4, 2008, 21 pgs.

* cited by examiner

MACHINING SYSTEM

CROSS-REFERENCE TO RELATED APPLICATION

This application is based upon and claims the benefit of priority from Japanese Patent Application No. 2018-057823 filed on Mar. 26, 2018, the contents of which are incorporated herein by reference.

BACKGROUND OF THE INVENTION

Field of the Invention

The present invention relates to a machining system.

Description of the Related Art

Japanese Laid-Open Patent Publication No. 2016-091142 discloses a machining system including a machine tool, peripheral equipment and a numerical controller for operating the machine tool in link with the peripheral equipment. The numerical controller of this machining system outputs arrangement data of items in the machine tool based on the machining program and shape data of items such as tools, workpieces, chucks, etc. used in the machine tool. Based on the item arrangement data, the peripheral equipment is adapted to start operating at such timing that the motion of the peripheral equipment will not interfere with the items driven in the machine tool.

SUMMARY OF THE INVENTION

In the case of Japanese Laid-Open Patent Publication No. 2016-091142, since the shape data of items such as tools and the like are stored in the memory in advance, it is supposed that the shape of the actual tool becomes different from the shape data stored in the memory due to, for example, tool wear caused by the machining of workpieces.

It is therefore an object of the present invention to provide a machining system capable of easily and accurately generating a three-dimensional shape.

An aspect of the present invention resides in a machining system including a machine tool and a three-dimensional shape generating apparatus configured to generate a three-dimensional shape of part of the machine tool. The machine tool includes: a spindle to which a tool is attached; a table configured to support a workpiece; a motor configured to drive a moving mechanism configured to move the spindle and the table; and a camera configured to move together with the table relative to the spindle so as to take an image of the spindle side, or to move together with the spindle relative to the table so as to take an image of the table side. The three-dimensional shape generating apparatus includes: an image capture unit configured to capture a first image from the camera when a relative position of the table relative to the spindle is at a first relative position, and capture a second image from the camera when the relative position is at a second relative position different from the first relative position; and a shape generator configured to generate a three-dimensional shape of at least one subject, based on the first image, the second image and a first relative distance between the first relative position and the second relative position.

According to the present invention, since the camera that moves together with the table relative to the spindle or the camera that moves together with the spindle relative to the table is used, it is possible to accurately generate a three-dimensional shape of a subject as compared with a case in which a camera that does not relatively move is used. In addition, it is possible to easily generate a three-dimensional shape as compared with a case where two cameras are used to generate a three-dimensional shape.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A machining system according to the present invention will be detailed hereinbelow by describing preferred embodiments with reference to the accompanying drawings.

Figure 1:
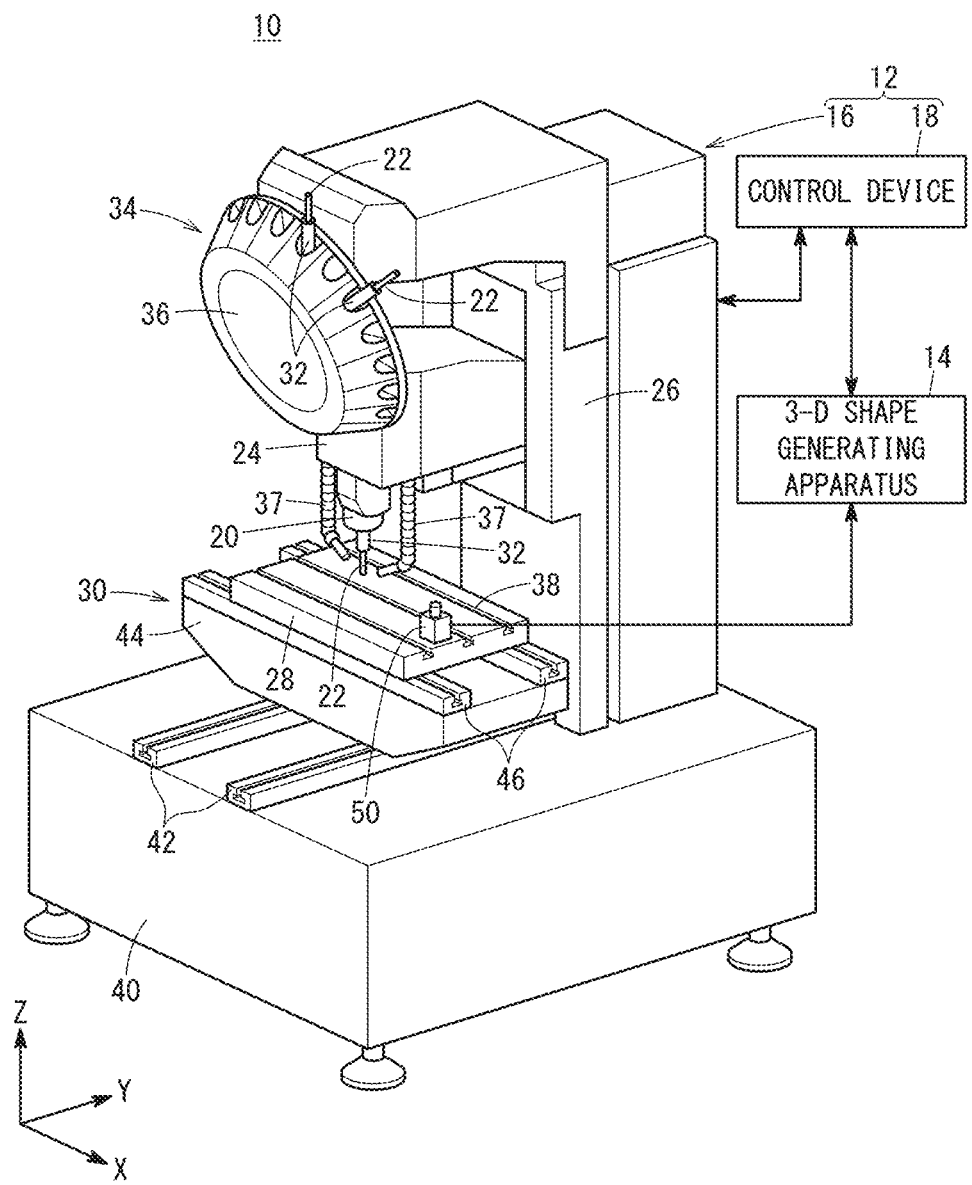
FIG. 1 is a schematic diagram showing a machining system of the embodiment.

FIG. 1 is a schematic diagram showing a machining system 10. The machining system 10 includes a machine tool 12 and a three-dimensional (3-D) shape generating apparatus 14. The machine tool 12 has a machine tool body 16 and a control device 18 for controlling the machine tool body 16. The control device 18 and the three-dimensional shape generating apparatus 14 communicate with each other wirelessly or by wire to exchange various kinds of information.

The machine tool body 16 machines an unillustrated workpiece (an object to be machined) with a tool 22 attached to a spindle 20. The machine tool body 16 includes a spindle 20, a spindle head 24 supporting the spindle 20, a column 26 for moving the spindle head 24 in the Z-direction and the negative Z-direction (in the vertical direction), a table 28 arranged below the spindle 20 (negative Z-direction) and configured to support the workpiece, and a table driving unit 30 for moving the table 28 in the X-direction and the Y-direction. It is assumed that the X-direction, the Y-direction and the Z-direction are ideally orthogonal to each other. The direction of gravity acts in the negative Z-direction.

The tool 22 is attached to the spindle 20 via a tool holder 32 detachably attached to the spindle 20. The tool holder 32 may have an anti-vibration mechanism such as a hydrochuck. The tool 22 attached to the spindle 20 via the tool holder 32 has its longitudinal direction along the spindle 20 so that the spindle 20 and the tool 22 rotate together. Examples of the tool 22 include non-rotation tools (spring necked tools), drills, end mills, milling cutters and the like.

The machine tool body 16 is configured as a machining center that can change the tool 22 attached to the spindle 20 by an automatic tool changer 34. The automatic tool changer 34 has a tool magazine 36 capable of housing (holding) a plurality of tools 22 each of which is held by a tool holder 32.

The spindle head 24 is provided with at least an unillustrated Z-axis moving mechanism for moving the spindle head 24 relative to the column 26 in the Z-axis direction parallel to the Z-direction and a Z-axis motor for driving the Z-axis moving mechanism. The Z-axis moving mechanism has a power converting mechanism (ball screw, nut, etc.) that converts the rotary motion of the Z-axis motor into linear motion and transmits the motion to the spindle head 24. As the spindle head 24 is moved in the Z-direction, the spindle 20 supported by the spindle head 24 also moves in the Z-direction, and the tool 22 attached to the spindle 20 also moves in the z-direction.

The spindle head 24 is provided with a coolant nozzle 37 for ejecting a cutting fluid toward the tool 22 during machining. The spindle head 24 has therein an unillustrated spindle motor, which causes the spindle 20 to rotate about the Z-axis parallel to the Z-direction. As the spindle 20 rotates about the Z-axis, the tool 22 attached to the spindle 20 also rotates about the Z-axis.

The table 28 has, formed in an upper surface thereof, a plurality of lock grooves 38 linearly extending in the X-direction and which are arranged at predetermined intervals along the Y-direction. The workpiece is fixed to the table 28 via an unillustrated fixing jig. The fixing jig is configured to fix the object to be machined on the upper surface of the table 28 using the lock grooves 38.

The table driving unit 30 moves the table 28 in the X-direction and the Y-direction, and is supported by a base 40. The table driving unit 30 includes Y-axis sliders 42, a saddle 44 and X-axis sliders 46. The saddle 44 is supported so as to be movable in the Y-direction relative to the base 40 via the Y-axis sliders 42. The table 28 is supported so as to be movable in the X-direction relative to the saddle 44 via the X-axis sliders 46.

The saddle 44 is provided with at least an unillustrated Y-axis moving mechanism for moving the saddle 44 in the Y-axis direction parallel to the Y-direction relative to the base 40 and a Y-axis motor for driving the Y-axis moving mechanism. The Y-axis moving mechanism has a power converting mechanism (ball screw, nut, etc.) for converting the rotary motion of the Y-axis motor into linear motion and transmitting the motion to the saddle 44.

Similarly, the table 28 is also provided with at least an unillustrated X-axis moving mechanism for moving the table 28 in the X-axis direction parallel to the X-direction relative to the saddle 44 and an X-axis motor for driving the X-axis moving mechanism. The X-axis moving mechanism has a power converting mechanism (ball screw, nut, etc.) for converting the rotary motion of the X-axis motor into linear motion and transmitting the motion to the table 28.

The machine tool body 16 includes a camera 50. The camera 50 is to pick up (capture) an image of the spindle 20 side, and is arranged so as to relatively move together with the table 28 relative to the spindle 20. In the present embodiment, the camera 50 is arranged on the upper surface of the table 28, and captures images of the tool 22, the tool holder 32, the spindle 20, the coolant nozzle 37 and the spindle head 24 as the subjects.

The control device 18 has at least a processor, a memory and an input unit such as a keyboard. Upon receiving a machining command to machine the workpiece from the input unit, the control device 18 sequentially executes pre-machining mode, machining mode and post-machining mode based on the program stored in the memory.

That is, in the pre-machining mode, the control device 18 individually controls the X-axis motor, the Y-axis motor and the Z-axis motor so as to move the spindle 20 and the table 28 relative to each other from a predetermined start position to a predetermined end position. Further, the control device 18 outputs positional information indicating the position (relative position) of the table 28 relative to the spindle 20 corresponding to the above relative movement to the three-dimensional shape generating apparatus 14.

Upon completion of the relative movement to the predetermined end position, the control device 18 stands by for reception of a signal indicating success or failure as to generation of the pre-machining three-dimensional shape from the three-dimensional shape generating apparatus 14. Here, when receiving a failure signal from the three-dimensional shape generating apparatus 14, the control device 18 moves the spindle 20 and the table 28 relative to each other once again from the predetermined start position to the predetermined end position, and outputs the positional information to the three-dimensional shape generating apparatus 14.

On the other hand, when receiving a success signal from the three-dimensional shape generating apparatus 14, the control device 18 enters the machining mode. In the machining mode, the control device 18 individually controls the X-axis motor, the Y-axis motor and the Z-axis motor and moves the spindle 20 and the table 28 relative to each other so as to machine the workpiece supported on the table 28 into a specified shape with the tool 22 attached to the spindle 20.

When completing the machining of the workpiece, the control device 18 transitions to the post-machining mode. In the post-machining mode, the control device 18 individually controls the X-axis motor, the Y-axis motor and the Z-axis motor so as to move the spindle 20 and the table 28 relative to each other from the same start position as in the pre-machining mode to the end position. Further, the control device 18 outputs the positional information corresponding to this relative movement to the three-dimensional shape generating apparatus 14.

Upon completion of the relative movement to the predetermined end position, the control device 18 stands by for reception of a signal indicating success or failure of generation of the post-machining three-dimensional shape from the three-dimensional shape generating apparatus 14. Here, when receiving a failure signal from the three-dimensional shape generating apparatus 14, the control device 18 moves the spindle 20 and the table 28 relative to each other once again from the predetermined start position to the predetermined end position, and outputs the positional information to the three-dimensional shape generating apparatus 14.

When receiving a success signal from the three-dimensional shape generating apparatus 14, the control device 18 moves the spindle 20 and the table 28 relative to each other and moves the spindle 20 and the table 28 back to their initial positions. It should be noted that when receiving an abnormality signal from the three-dimensional shape generating apparatus 14 before completing the post-machining mode, the control device 18 terminates the mode which is currently being executed when the abnormality signal received, and the spindle 20 and table 28 are returned to their initial positions.

The three-dimensional shape generating apparatus 14 has a three-dimensional shape generation mode and an estimation mode. In the three-dimensional shape generation mode, the three-dimensional shape generating apparatus 14 generates a three-dimensional shape (hereinafter referred to as "pre-machining shape") based on the positional information supplied from the control device 18 before machining the workpiece and the imaging result of the camera 50, and stores the generated pre-machining shape.

Further, in the three-dimensional shape generation mode, the three-dimensional shape generating apparatus 14 generates a three-dimensional shape (hereinafter referred to as "post-machining shape") based on the positional information supplied from the control device 18 after machining the workpiece and the imaging result of the camera 50, and stores the generated post-machining shape.

In the estimation mode, the three-dimensional shape generating apparatus 14 estimates the state of the subjects taken by the camera 50 based on the pre-machining shape and the post-machining shape and notifies an operator of the estimated state.

Figure 2:
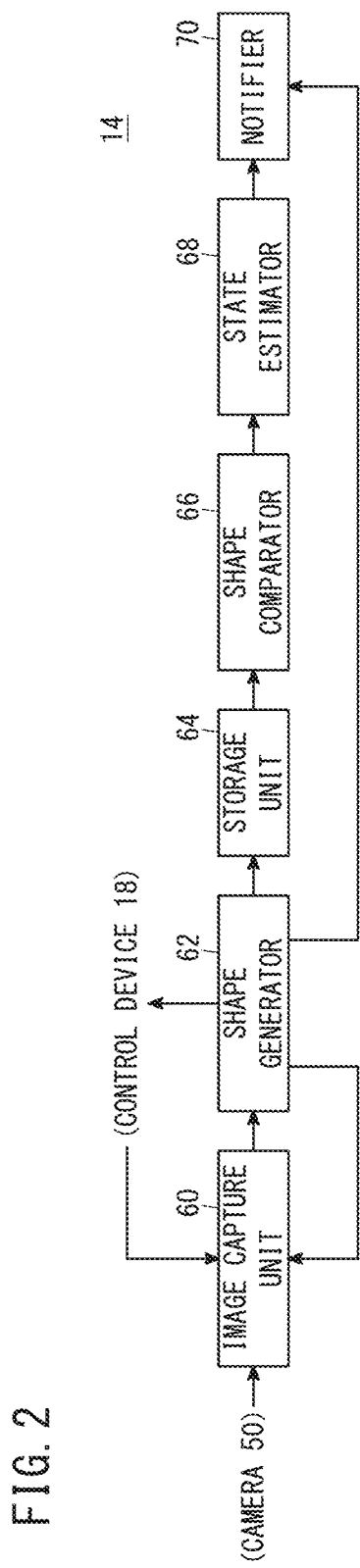
FIG. 2 is a block diagram showing a configuration of a three-dimensional shape generating apparatus according to the embodiment.

FIG. 2 is a block diagram showing a configuration of the three-dimensional shape generating apparatus 14. The three-dimensional shape generating apparatus 14 includes an image capture unit 60, a shape generator 62, a storage unit 64, a shape comparator 66, a state estimator 68 and a notifier 70.

In the three-dimensional shape generating apparatus 14, the image capture unit 60 and the shape generator 62 operate in the three-dimensional shape generation mode, whereas the shape comparator 66, the state estimator 68 and the notifier 70 operate in the estimation mode.

Figure 3:
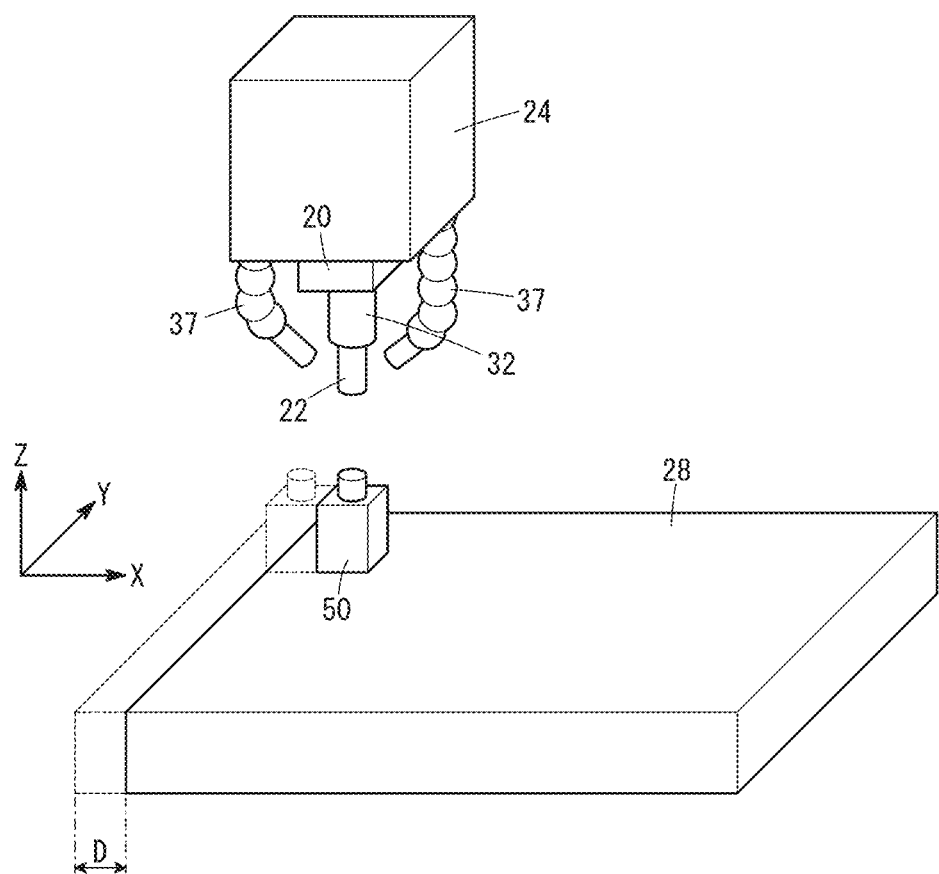
FIG. 3 is a conceptual diagram showing a state of image acquisition.

The image capture unit 60 takes an image from the camera 50 based on the positional information supplied from the control device 18 before or after machining. FIG. 3 is a conceptual diagram showing a state of image capture. For the sake of simplicity, FIG. 3 shows a case where the table 28 is relatively moved along the XY-plane (horizontally) with respect to the spindle 20.

Upon receiving positional information from the control device 18, the image capture unit 60 obtains a first image from the camera 50, based on the positional information, when the position (relative position) of the table 28 relative to the spindle 20 is at a first relative position (see the broken line in FIG. 3).

Further, when the position (relative position) of the table 28 relative to the spindle 20 is at a second relative position different from the first relative position, the image capture unit 60 obtains a second image from the camera 50 based on the positional information (see the solid line in FIG. 3). As obtaining the first image and the second image, the image capture unit 60 outputs the acquired first and second images and the first and second relative positions to the shape generator 62. It should be noted that the first relative position and the second relative position are fixed before and after machining.

The shape generator 62 generates a three-dimensional shape of at least one subject on the spindle 20 side. The subjects include at least the tool 22. In addition to the tool 22, for example, the tool holder 32, the spindle 20, the coolant nozzle 37 and the spindle head 24 may be included.

Specifically, when receiving the first and second images and the first and second relative positions from the image capture unit 60, the shape generator 62 generates a three-dimensional shape of the subjects.

That is, the shape generator 62 determines a first relative distance D (see FIG. 3) between the first relative position and the second relative position. The first relative distance D is not the travel distance (moving length) that the table 28 moves relative to the spindle 20 from the first relative position to the second relative position, but is the shortest distance between the first relative position and the second relative position.

Further, the shape generator 62 determines multiple points on at least the contour of the subjects included in one of the first and second images as feature points, and detects correspondent feature points that correspond to the determined feature points, from the other of the first and second images.

As acquiring the first relative distance D, the multiple feature points and their correspondent feature points, the shape generator 62 generates a three-dimensional shape (pre-machining shape or post-machining shape), based on the first relative distance D, the multiple feature points and their correspondent feature points. As a specific generation method, well-known methods can be used.

At this stage, when having generated a three-dimensional shape (pre-machining shape or post-machining shape) successfully, the shape generator 62 produces a success signal and outputs it to the control device 18. Further, when the generation of a three-dimensional shape (pre-machining shape or post-machining shape) is successful, the shape generator 62 stores the successful three-dimensional shape (pre-machining shape or post-machining shape) in the storage unit 64.

In contrast, when having failed to successfully generate a three-dimensional shape (pre-machining shape or post-machining shape), the shape generator 62 produces a failure signal and outputs it to the control device 18. Further, when the generation of a three-dimensional shape (pre-machining shape or post-machining shape) results in failure, the shape generator 62 retries to generate the three-dimensional shape (pre-machining shape or post-machining shape).

Specifically, the shape generator 62 newly sets up a second relative distance D' which is different from the first relative distance D, and causes the image capture unit 60 to once again take first and second images at respective positions which are spaced from each other by the second relative distance D'. More specifically, the first relative distance D when the generation of the three-dimensional shape (pre-machining shape or post-machining shape) failed, is modified (i.e., increased or decreased) to the second relative distance D', and the image capture unit 60 is notified of the modified second relative distance D'. The image capture unit 60 captures the first image and the second image again under a condition that the relative distance between the first relative position at which the camera 50 takes the first image and the second relative position at which the camera 50 takes the second image is equal to the second relative distance D', and outputs the first and second images to the shape generator 62.

Upon receiving the first and second images thus recaptured by the image capture unit 60, the shape generator 62 retries to generate a pre-machining shape, based on the first and second images and the second relative distance D'. When the shape generator 62 fails to successfully generate a three-dimensional shape (pre-machining shape or post-machining shape) even after retrying to generate the three-dimensional shape a predetermined number of times, it produces an abnormality signal and outputs it to the control device 18 and the notifier 70.

The shape comparator 66 reads out the pre-machining shape and the post-machining shape stored in the storage unit 64 and compares them, and outputs the comparison result to the state estimator 68. The state estimator 68 estimates the state of the post-machining shape based on the comparison result from the shape comparator 66.

Figure 4:
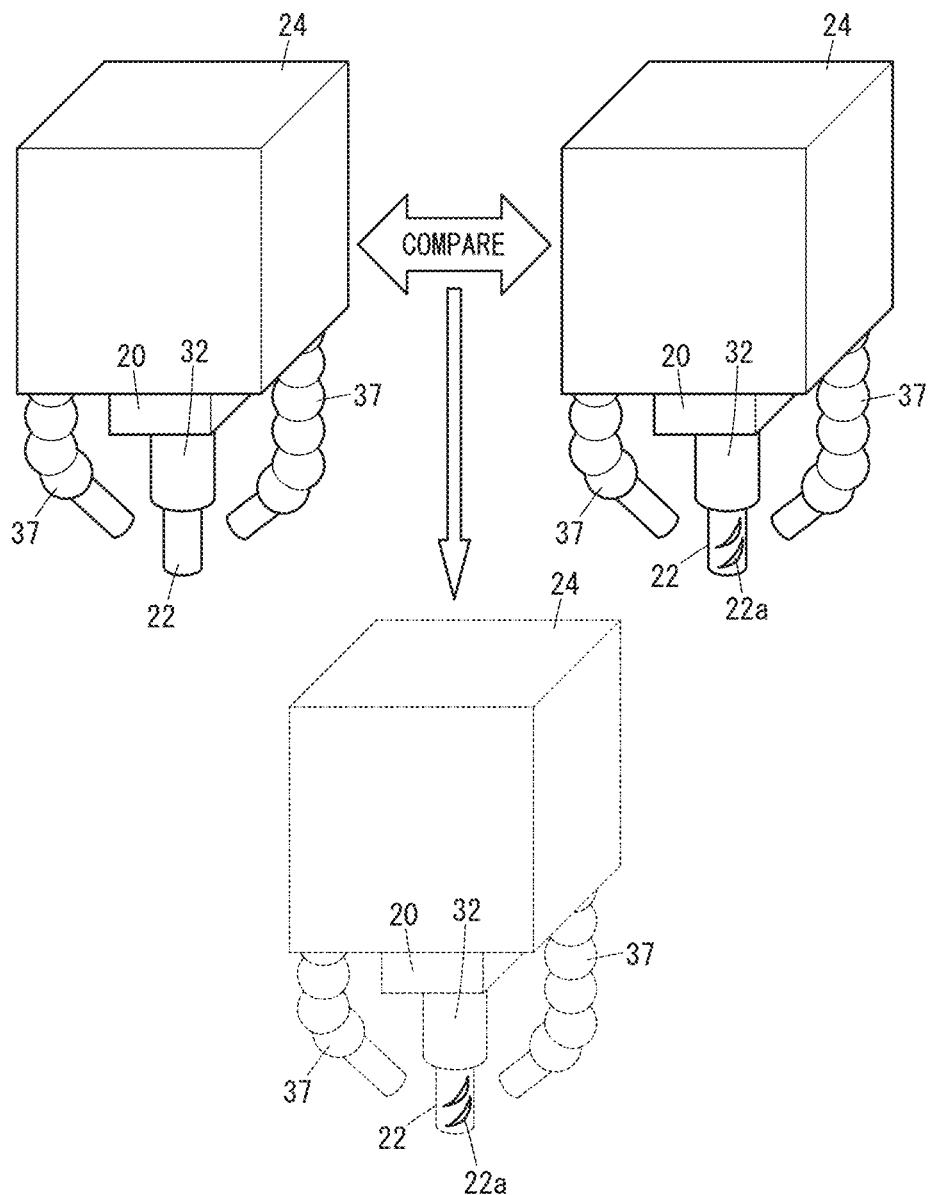
FIG. 4 is a conceptual diagram illustrating a result of comparison between three-dimensional shapes.

FIG. 4 is a conceptual diagram illustrating a result of comparison between three-dimensional shapes. When the shape of the tool 22 before machining and the shape after machining are different, the different portion, designated at 22a, is extracted as a result of comparison (difference) between the pre-machining shape and the post-machining shape.

When the portion 22a that did not exist on the pre-machining shape of the tool 22 appears on the post-machining shape of the tool 22, the state estimator 68 estimates that cutting chip is adhering (attached) to the tool 22. When the portion 22a that was present on the pre-machining shape of the tool 22 has disappeared on the post-machining shape of the tool 22, the state estimator 68 estimates that the tool 22 has worn down. As estimating the state of the post-machining shape, the state estimator 68 generates a notification signal indicating that the estimated state should be reported, and outputs the notification signal to the notifier 70.

The notifier 70 notifies the estimation result estimated by the state estimator 68. Specifically, the notifier 70 displays, for example, both the pre-machining shape and the post-machining shape together with the comparison result (difference) between the pre-machining shape and the post-machining shape on the display unit, and also displays the estimation result of the state estimator 68.

When receiving an abnormality signal from the shape generator 62, the notifier 70 issues a notification that no three-dimensional shape could be generated. Specifically, the notifier 70 displays on the display unit, for example, that no three-dimensional shape could be generated.

Note that the notifier 70 may have a display unit or may control an external display unit. The notifier 70 may give notice by using another notifying method in addition to the above notifying method for displaying on the display unit.

Figure 5:
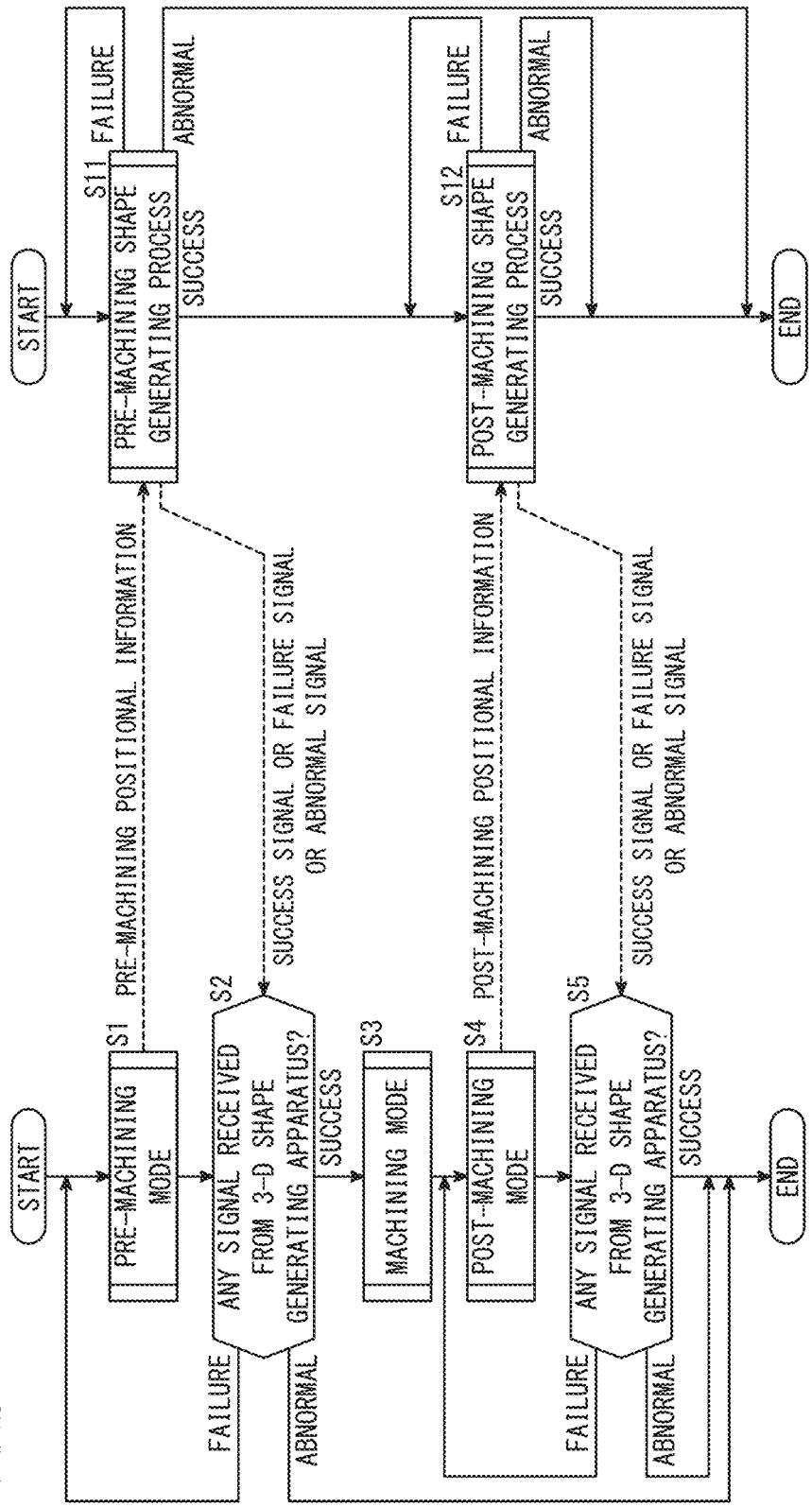
FIG. 5 is a flowchart showing a control sequence of three-dimensional shape generation of a machining system of the embodiment.

Next, a processing sequence of three-dimensional shape generation in the machining system 10 will be described. FIG. 5 is a flowchart showing a control sequence of three-dimensional shape generation in the machining system 10. On receiving a machining command, the control device 18 goes to step S1. At step S1 the control device 18 executes a pre-machining mode to relatively move the spindle 20 and the table 28 and output the positional information corresponding to the relative movement to the three-dimensional shape generating apparatus 14. After the pre-machining mode is completed, the control device 18 goes to step S2 and waits at step S2 until reception of a signal from the three-dimensional shape generating apparatus 14.

Upon receiving the positional information from the control device 18, the three-dimensional shape generating apparatus 14 goes to step S11 to execute a pre-machining shape generating process.

At this stage, when the three-dimensional shape generating apparatus 14 fails to generate a pre-machining shape, it produces a failure signal and outputs it to the control device 18. When receiving the failure signal, the control device 18 returns to step S1, and executes the pre-machining mode again and outputs the positional information to the three-dimensional shape generating apparatus 14. Upon receiving the positional information, the three-dimensional shape generating apparatus 14 returns to step S11 to retry to generate a three-dimensional shape by performing the pre-machining shape generating process again.

When no pre-machining shape can be successfully generated even after retrying generation of the pre-machining shape a predetermined number of times, the three-dimensional shape generating apparatus 14 generates an abnormality signal and outputs it to the control device 18. At the same time, the apparatus 14 gives notice of failure of generation of a three-dimensional shape and terminates the pre-machining shape generation process. When receiving the abnormality signal, the control device 18 returns the spindle 20 and the table 28 to their initial positions and terminates the control of the machine tool body 16.

When generation of the pre-machining shape is successful, the three-dimensional shape generating apparatus 14 stores the successfully-generated pre-machining shape in the storage unit 64, generates a success signal, outputs it to the control device 18, and goes to step S12. When receiving the success signal, the control device 18 goes to step S3.

At step S3, the control device 18 executes the machining mode to move the spindle 20 and the table 28 relative to each other, thereby machining the workpiece into a designated shape. When the machining is completed, the control proceeds to step S4. At step S4, the control device 18 executes a post-machining mode to relatively move the spindle 20 and the table 28, and outputs the positional information corresponding to the relative movement to the three-dimensional shape generating apparatus 14. Upon completion of the post-machining mode, the control device 18 proceeds to step S5 and waits until reception of a signal from the three-dimensional shape generating apparatus 14.

As receiving the positional information from the control device 18, the three-dimensional shape generating apparatus 14 executes a post-machining shape generation process.

At this stage, when the three-dimensional shape generating apparatus 14 fails to generate a post-machining shape, it produces a failure signal and outputs it to the control device 18. When receiving the failure signal, the control device 18 returns to step S4, and executes the post-machining mode again and outputs the positional information to the three-dimensional shape generating apparatus 14. Upon receiving the positional information, the three-dimensional shape generating apparatus 14 returns to step S12 to retry to generate a post-machining shape by performing the post-machining shape generating process again.

On the other hand, when no post-machining shape can be successfully generated even after retrying generation of the post-machining shape a predetermined number of times, the three-dimensional shape generating apparatus 14 generates an abnormality signal and outputs it to the control device 18. At the same time, the apparatus 14 gives notice of failure of generation of a three-dimensional shape and terminates the post-machining shape generation process. When receiving the abnormality signal, the control device 18 returns the spindle 20 and the table 28 to their initial positions and terminates the control of the machine tool body 16.

When generation of the post-machining shape is successful, the three-dimensional shape generating apparatus 14 stores the successfully-generated post-machining shape in the storage unit 64, generates a success signal, outputs it to the control device 18, and terminates the post-machining shape generating process. When receiving the success signal, the control device 18 returns the spindle 20 and the table 28 to their initial positions and terminates the control of the machine tool body 16.

Figure 6:
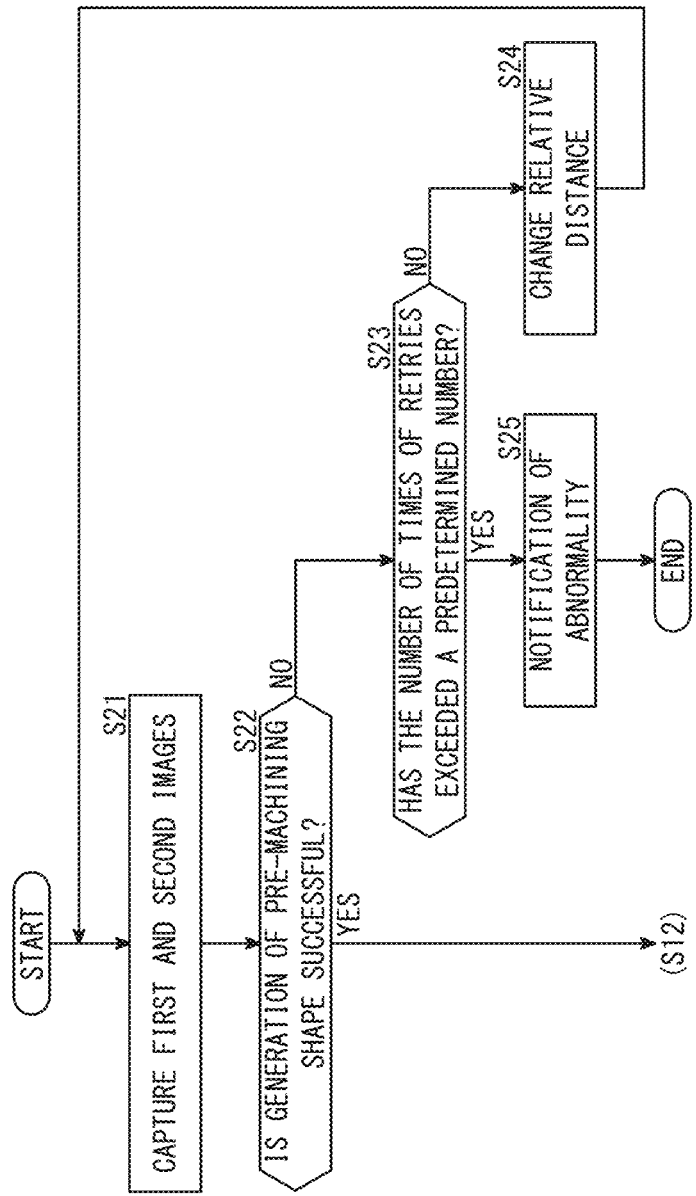
FIG. 6 is a flowchart showing a control sequence of a pre-machining shape generation process.

Next, the above-described pre-machining shape generation process will be described. The above-described post-machining shape generation process is the same as the details of the pre-machining shape generation process to be described below, so the description is omitted. FIG. 6 is a flowchart showing the control sequence of the pre-machining shape generation process.

When receiving the positional information from the control device 18, the image capture unit 60 goes to step S21. At step S21, based on the positional information, the image capture unit 60 captures the first image when the table 28 is positioned at the first relative position relative to the spindle 20, and captures the second image when the table 28 is positioned at the second relative position, then the control goes to step S22.

At step S22, the shape generator 62 generates a pre-machining shape, based on the first and second images acquired at step S21 and the first relative distance D between the first relative position at which the first image was captured and the second relative position at which the second image was captured.

At this stage, when having generated the pre-machining shape successfully, the shape generator 62 produces a success signal and outputs it to the control device 18, and the control proceeds to step S12 (FIG. 5). On the other hand, when the shape generator 62 fails to generate the pre-machining shape, the control proceeds to step S23 where it is determined whether the number of retries exceeds the predetermined number of times.

When the number of retries does not exceed the predetermined number of times, the shape generator 62 produces a failure signal and outputs it to the control device 18, then the control proceeds to step S24. At step S24, the shape generator 62 changes the relative distance between the first relative position at which the first image was captured at step S21 and the second relative position at which the second image was captured at step S21, from the first relative distance D to a second relative distance D', then the control returns to step S21.

However, when the number of retries exceeds the predetermined number of times, the shape generator 62 goes to step S25. At step S25, the shape generator 62 generates an abnormality signal and outputs it to the notifier 70, thereby issuing a notification that the pre-machining shape was not able to be generated, and then terminates the pre-machining shape generation process.

Figure 7:
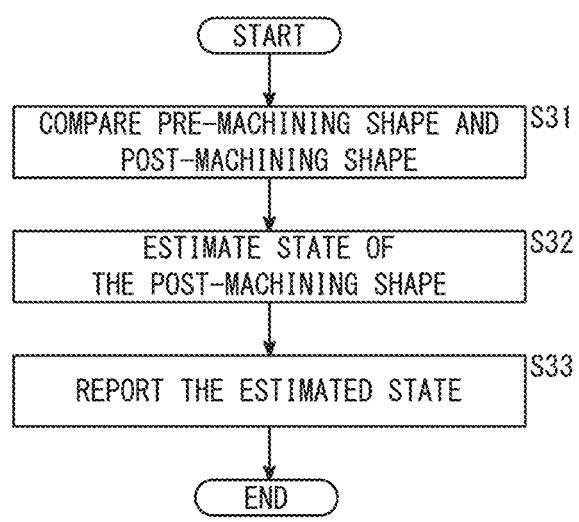
FIG. 7 is a flowchart showing a control sequence of an estimation process.

Next, the processing sequence of an estimation process of the three-dimensional shape generating apparatus 14 will be described. FIG. 7 is a flowchart showing the control sequence of the estimation process. For example, when receiving an estimation start command from the input unit, or when the pre-machining shape and the post-machining shape are stored in the storage unit 64, the three-dimensional shape generating apparatus 14 goes to step S31.

At step S31, the three-dimensional shape generating apparatus 14 reads out the pre-machining shape and the post-machining shape from the storage unit 64, compares the read pre-machining shape and the post-machining shape, and proceeds to step S32. At step S32, the three-dimensional shape generating apparatus 14 estimates the state of the post-machining shape based on the comparison result obtained at step S31, then notifies the operator of the estimated state at step S33, and then terminates the estimation process.

[Modifications]

Although the above embodiment has been described as an example of the present invention, the technical scope of the present invention should not be limited to that described in the above embodiment. It goes without saying that various modifications or improvements can be added to the above embodiment. It is obvious from the description of the scope of the claims that modes with such modifications or improvements can be included in the technical scope of the invention.

Part of the modified or improved forms will be described below as Modifications. Note that the same reference numerals are given to the same components as those described in the above embodiment, and repeated explanation is omitted.

<Modification 1>

Figure 8:
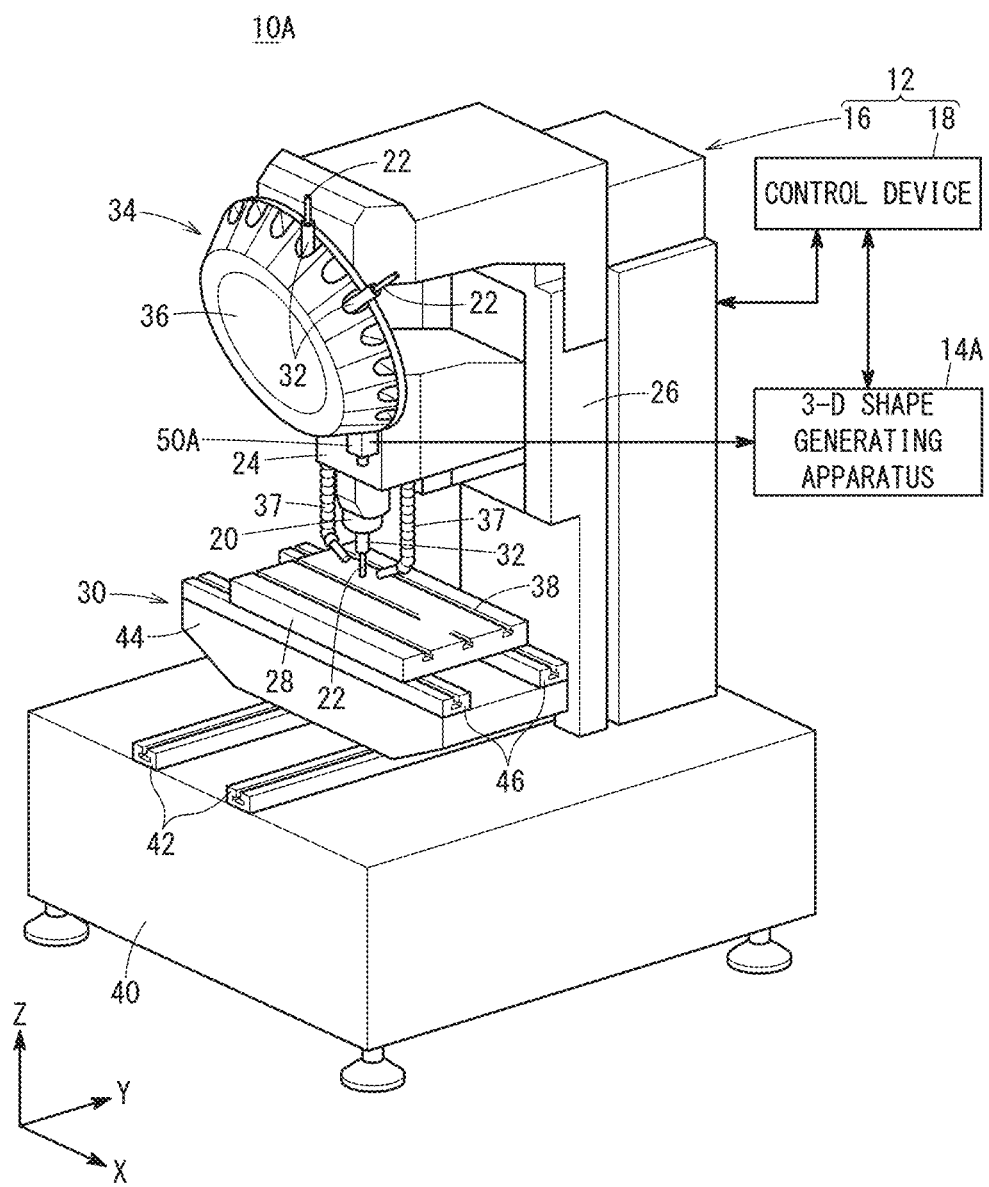
FIG. 8 is a schematic diagram showing a machining system of Modification 1.

FIG. 8 is a schematic diagram showing a machining system 10A of Modification 1. In the machining system 10A of Modification 1, a camera 50A is provided in place of the camera 50 of the above embodiment. This camera 50A is to pick up the image of the table 28 side, and is arranged so as to move together with the spindle 20 relative to the table 28. In this embodiment, the camera 50A is arranged on a flank (i.e., a side) of the spindle head 24, and captures images of the workpiece, the fixing jig for fixing the workpiece to the table 28, lock grooves 38, the table 28, etc., as subjects.

Figure 9:
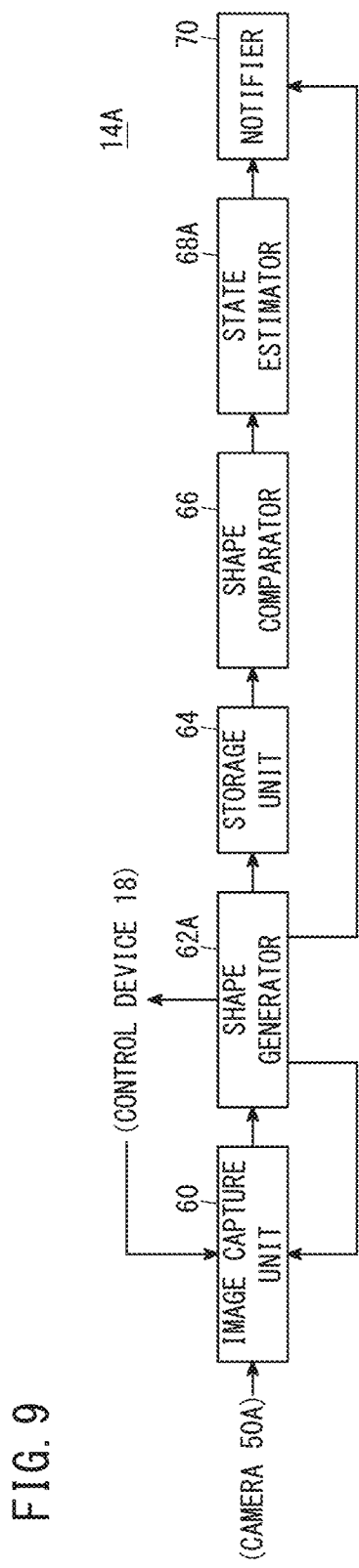
FIG. 9 is a block diagram showing a configuration of a three-dimensional shape generating apparatus according to Modification 1.

Further, in the case of the machining system 10A of Modification 1, a three-dimensional shape generating apparatus 14A is provided in place of the three-dimensional shape generating apparatus 14 of the above embodiment. FIG. 9 is a block diagram showing the configuration of the three-dimensional shape generating apparatus 14A. In the three-dimensional shape generating apparatus 14A, a shape generator 62A is provided in place of the shape generator 62 in the above embodiment, and a state estimator 68A is provided in place of the state estimator 68 in the above embodiment.

The shape generator 62A generates a three-dimensional shape of at least one subject on the table 28 side. The subject includes at least a workpiece and includes, in addition to the workpiece, for example, the fixing jig, the lock groove 38 and the table 28.

Although the generation target of the three-dimensional shape is different in the shape generator 62A as described above, the method of generating the three-dimensional shape is the same as in the above-described embodiment, and thus its description will be omitted.

Figure 10:
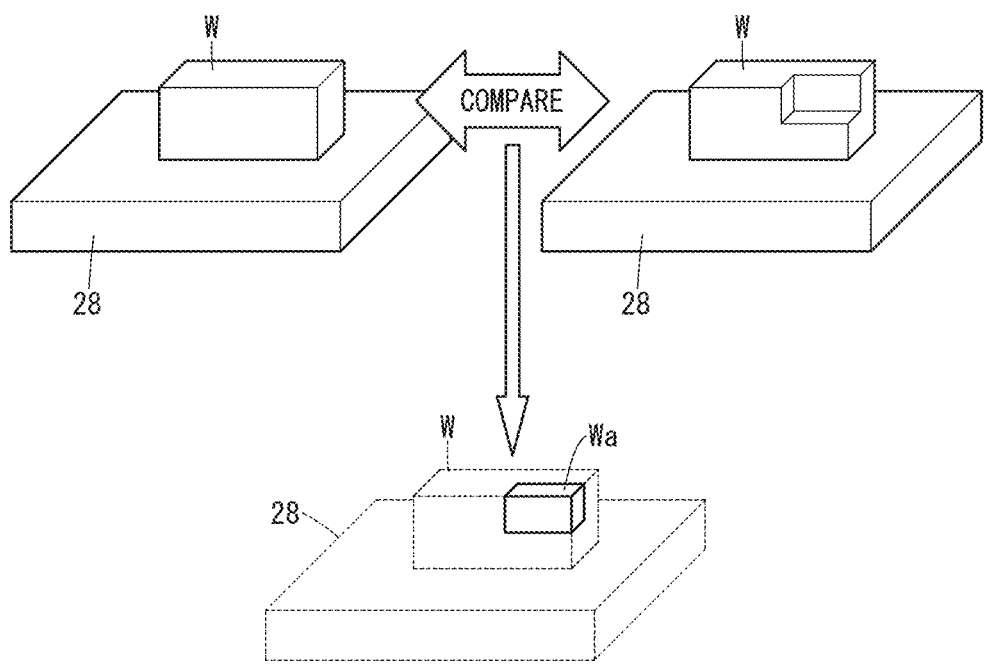
FIG. 10 is a conceptual diagram illustrating a result of comparison between three-dimensional shapes.

The state estimator 68A estimates the state of the post-machining shape based on the comparison result from the shape comparator 66. FIG. 10 is a conceptual diagram illustrating a result of comparison between three-dimensional shapes. When the shape of the workpiece W before machining and the shape after machining are different, the different portion, designated at Wa, is extracted as a comparison result (difference) between the pre-machining shape and the post-machining shape.

When a portion that was present on the pre-machining shape of the workpiece W disappears on the post-machining shape of the workpiece W, the state estimator 68A estimates the disappeared portion Wa as a cutout or cutoff portion. Further, in a case where a portion that did not exist on the pre-machining shape of the workpiece W appears on the post-machining shape of the workpiece W, the state estimator 68A estimates that cutting chip is attached to the workpiece W. Upon estimating the state of the post-machining shape, the state estimator 68A generates a notification signal indicating that the estimated state should be reported, and outputs the notification signal to the notifier 70.

In this way, according to the machining system 10A of Modification 1, it is possible to easily and accurately generate a three-dimensional shape, like the machining system 10 of the above embodiment.

<Modification 2>

In the above embodiment, the camera 50 for imaging the spindle 20 side is provided on the table 28. However, as long as the camera 50 can move together with the table 28 relative to the spindle 20, it may be disposed on a member or the like other than the table.

Similarly, in Modification 1, the camera 50A for imaging the table 28 side is provided on the spindle head 24. However, as long as the camera 50A moves together with the spindle 20 relative to the table 28, it may be disposed on a member or the like other than the spindle head 24.

<Modification 3>

In the above embodiment, the control device 18 of the machine tool 12 does not machine the workpiece based on the tool length and the tool diameter of the tool 22 obtained from the pre-machining shape or the post-machining shape generated by the shape generator 62, but the control device 18 may be configured to machine the workpiece based on these factors.

Specifically, for example, the control device 18 is configured to compensate the parameters for moving the spindle 20 and the table 28 relative to each other, based on the tool length and the tool diameter of the tool 22 obtained from the pre-machining shape or the post-machining shape of the tool 22 generated by the shape generator 62.

In this way, the machine tool 12 can machine a workpiece, by using the tool length and the tool diameter of the tool 22 obtained from the pre-machining shape or the post-machining shape generated by the shape generator 62, whereby it is possible to improve the machining accuracy of the workpiece.

Here, the tool length and the tool diameter of the tool can be obtained by calculation based on the three-dimensional shape. The calculation of the tool length and the tool diameter of the tool may be performed by the three-dimensional shape generating apparatus 14 or the machine tool 12 (control device 18).

<Modification 4>

Figure 11:
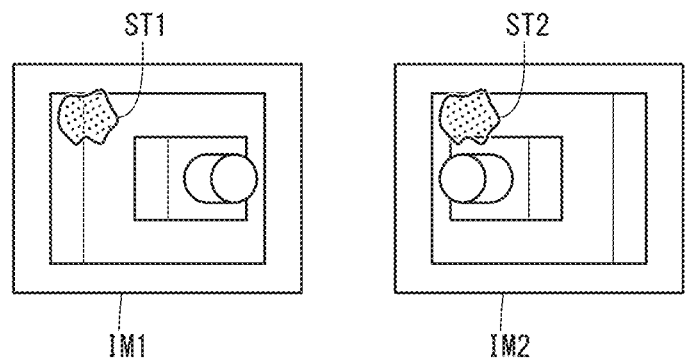
FIG. 11 is a view showing a state in which a camera lens is stained with working fluid.

FIG. 11 is a view showing a state in which the camera lens is stained with dielectric working fluid. When the camera lens of the camera 50 is stained with dielectric working fluid, a subject ST1 of the working fluid in a first image IM1 at the first relative position and a subject ST2 of the working fluid in a second image IM2 at the second relative position are located at substantially the same positions.

Therefore, it is possible to configure the three-dimensional shape generating apparatus 14 such that when there is no change in position between a subject ST1 in the first image IM1 captured at the first relative position and a subject ST2 in the second image IM2 captured at the second relative position, the apparatus 14 recognizes the subjects as a stain on the camera lens of the camera 50 and gives notice of the fact.

Similarly to the three-dimensional shape generating apparatus 14, when there are subjects which are located at the same positions in the respective first image and the second image, the three-dimensional shape generating apparatus 14A of Modification 1 may be configured so as to recognize the subjects as a stain on the camera lens of the camera 50A and give notice of the fact.

<Modification 5>

In the above embodiment, when there is a portion 22a that was extracted based on (difference) as the result of comparison between the pre-machining shape and the post-machining shape, the state estimator 68 estimates that cutting chip is attached to the tool 22 or that the tool 22 is worn away.

However, it is also possible to configure the state estimator 68 such as to determine that cutting chip is attached to the tool 22 or that the tool 22 has worn down if the size of the portion 22a extracted as a result of comparison between the pre-machining shape and the post-machining shape is equal to or larger than a predetermined threshold. This configuration makes it possible to avoid a situation where an alert is issued even when cutting chip adhering to the tool 22 or a wearing portion of the tool 22 is not so large as to affect the machining.

<Modification 6>

The three-dimensional shape generating apparatus 14A of Modification 1 is configured to, if a portion on the shape of the workpiece W before machining has disappeared on the post-machining shape of the workpiece W, estimate that the portion is a cutout or cutoff portion and issue a notification.

However, the three-dimensional shape generating apparatus 14A may be configured to report the degree of similarity between the shape of the estimated cutout or cutoff portion and the preset shape of the cutting portion designated in advance. This configuration makes it possible for the operator to know when to perform maintenance on the machine tool 12 and when to perform replacement of the tool 22.

<Modification 7>

In the above embodiment, the image capture unit 60 is configured to capture the first and second images at arbitrary positions while the control device 18 moves the spindle 20 and the table 28 relative to each other from the predetermined start position to the predetermined end position. However, the image capture unit 60 may be configured to capture the first image at the predetermined start position and the second image at the predetermined end position. In this case, when the shape generator 62 retries to generate the three-dimensional shape (pre-machining shape or post-machining shape), the control device 18 only needs to change one of the predetermined start position and the predetermined end position so as to change the relative distance from the first relative distance D to the different second relative distance D'.

<Modification 8>

Figure 12:
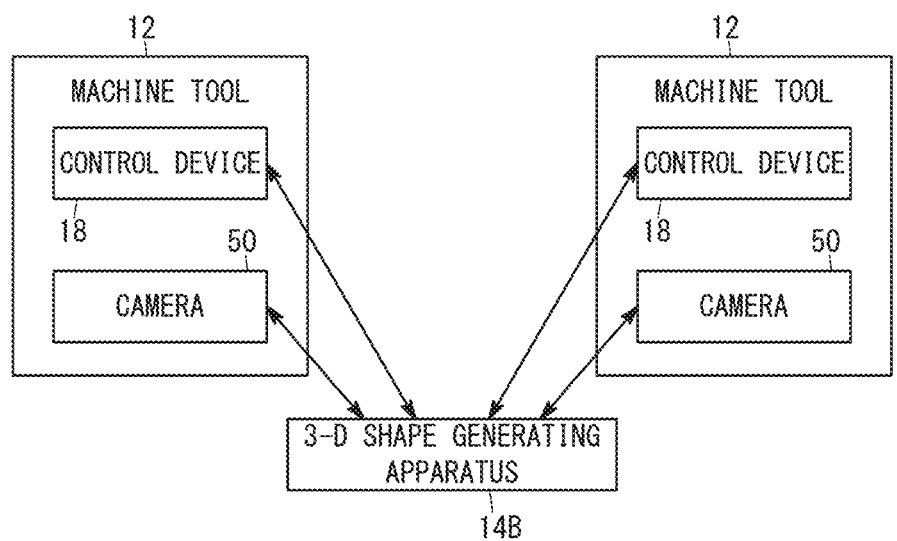
FIG. 12 is a diagram showing a machining system of Modification 7.

FIG. 12 is a diagram showing a machining system 10B according to Modification 7. The machining system 10B of Modification 7 is different from the machining system 10 of the above embodiment in that multiple machine tools 12 are provided. Further, the machining system 10B of Modification 7 is different from the machining system 10 of the above-described embodiment in that a three-dimensional shape generating apparatus 14B for generating a three-dimensional shape of part of each machine tool 12 is provided instead of the three-dimensional shape generating apparatus 14.

In this way, the three-dimensional shape generating apparatus 14B generates a three-dimensional shape of part of each machine tool 12, whereby it is possible to manage the condition, the tendency, etc. of each machine tool 12.

<Modification 9>

In the above-described embodiment, the three-dimensional shape generating apparatus 14 is provided separately from the control device 18, but may be the control device 18. That is, the control device 18 may have the image capture unit 60, the shape generator 62, the shape comparator 66, the state estimator 68 and the notifier 70 of the three-dimensional shape generating apparatus 14. This makes it possible to eliminate the housing or the like of the three-dimensional shape generating apparatus 14 and accordingly miniaturize the system.

<Modification 10>

The above Modifications 1 to 9 may be arbitrarily combined within a range in which no inconsistency occurs.

[Technical Ideas]

Technical ideas that can be grasped from the above embodiment and Modifications are described below.

The machining system (10, 10A, 10B) includes a machine tool (12) and a three-dimensional shape generating apparatus (14, 14A, 14B) configured to generate a three-dimensional shape of part of the machine tool (12).

The machine tool (12) includes: a spindle (20) to which a tool (22) is attached; a table (28) configured to support a workpiece; a motor configured to drive a moving mechanism configured to move the spindle (20) and the table (28); and a camera (50, 50A) configured to move together with the table (28) relative to the spindle (20) so as to take an image of the spindle (20) side, or to move together with the spindle (20) relative to the table (28) so as to take an image of the table (28) side.

The three-dimensional shape generating apparatus (14, 14A, 14B) includes: an image capture unit (60) configured to capture a first image from the camera (50, 50A) when a relative position of the table (28) relative to the spindle (20) is at a first relative position, and capture a second image from the camera (50, 50A) when the relative position is at a second relative position different from the first relative position; and a shape generator (62, 62A) configured to generate a three-dimensional shape of at least one subject, based on the first image, the second image and a first relative distance (D) between the first relative position and the second relative position.

Since the camera (50) is configured to move together with the table (28) relative to the spindle (20) or the camera (50A) is configured to move together with the spindle (20) relative to the table (28), it is possible to accurately generate a three-dimensional shape of the subject as compared with a case in which a camera that does not relatively move is used. In addition, it is possible to easily generate a three-dimensional shape as compared with a case where two cameras are used to generate a three-dimensional shape.

The three-dimensional shape generating apparatus (14, 14A, 14B) may further include: a shape comparator (66) configured to compare a pre-machining shape which is the three-dimensional shape generated by the shape generator (62, 62A) before machining the workpiece and a post-machining shape which is the three-dimensional shape generated by the shape generator (62, 62A) after machining the workpiece; a state estimator (68, 68A) configured to estimate a state of the subject after machining, based on the comparison result from the shape comparator (66); and a notifier (70) configured to give notice of the state estimated by the state estimator (68, 68A). This configuration makes it possible to inform the operator of the state of the machine tool (12) and other information through the state of the subject after machining.

In the machining system, the camera (50) may be configured to move together with the table (28) relative to the spindle (20) so as to take an image of the spindle (20) side, the shape generator (62) may be configured to generate a three-dimensional shape of at least the tool (22), and the state estimator (68) may be configured to estimate that chip is attached to the tool (22) if a portion (22a) which was not present on the pre-machining shape of the tool (22) appears on the post-machining shape of the tool (22), and to estimate that the tool (22) has worn down if a portion (22a) that was present on the pre-machining shape of the tool (22) has disappeared from the post-machining shape of the tool (22). This configuration makes it possible to give an occasion for an operator to replace the tool (22) and notify the operator of the state of the machine tool (12) and other information.

In the machining system, the camera (50A) may be configured to move together with the spindle (20) relative to the table (28) so as to take an image of the table (28) side, the shape generator (62A) may be configured to generate a three-dimensional shape of at least the workpiece, and the state estimator (68A) may be configured to estimate that chip is attached to the workpiece if a portion which was not present on the pre-machining shape of the workpiece appears on the post-machining shape of the workpiece, and configured to, if a portion that was present on the pre-machining shape of the workpiece has disappeared from the post-machining shape of the workpiece, estimate that the disappeared portion is a cutoff portion. This configuration makes it possible to notify the operator of the state of the machine tool (12) and other information through the state of the workpiece.

In the machining system, the camera (50) may be configured to move together with the table (28) relative to the spindle (20) so as to take an image of the spindle (20) side, the shape generator (62) may be configured to generate a three-dimensional shape of at least the tool (22), and the machine tool (12) may be configured to machine the workpiece by using the tool length and the tool diameter of the tool (22) acquired from the three-dimensional shape of the tool (22) generated by the shape generator (62). This makes it possible to improve the machining accuracy of the workpiece.

In the machining system, when the three-dimensional shape cannot be generated, the shape generator (62, 62A) may retry to generate the three-dimensional shape, based on a second relative distance (D') different from the first relative distance (D), and the first image and the second image captured by the image capture unit (60) respectively at the first relative position and the second relative position, which are spaced from each other by the second relative distance (D'). Therefore, even in a case where a three-dimensional shape cannot be generated due to a temporary error or the like, this configuration makes it possible to generate a three-dimensional shape after eliminating the error state and the like.

The machining system (10B) may include a plurality of the machine tools (12), and the three-dimensional shape generating apparatus (14B) may be configured to generate a three-dimensional shape of part of each of the machine tools (12). This makes it possible to manage the states, tendencies, etc. of individual machine tools (12).

The three-dimensional shape generating apparatus (14, 14A) may be a control device (18) of the machine tool (12). This makes it possible to omit the housing or the like of the three-dimensional shape generating apparatus (14, 14A) and accordingly miniaturize the system.

What is claimed is:

1. A machining system including a machine tool and a three-dimensional shape generating apparatus configured to generate a three-dimensional shape of part of the machine tool, wherein, the machine tool comprises:
a spindle to which a tool is attached;
a table configured to support a workpiece;

a motor configured to drive a moving mechanism configured to move the spindle and the table; and
a camera configured to move together with the table relative to the spindle so as to take an image of the spindle side,
the three-dimensional shape generating apparatus comprises:
an image capture unit configured to capture a first image from the camera when a relative position of the table relative to the spindle is at a first relative position, and capture a second image from the camera when the relative position is at a second relative position different from the first relative position; and
a shape generator configured to generate a three-dimensional shape of at least the tool, based on the first image, the second image and a first relative distance between the first relative position and the second relative position,
the machine tool is configured to machine the workpiece by using a tool length and a tool diameter of the tool acquired from the three-dimensional shape of the tool generated by the shape generator.

2. The machining system according to claim 1, wherein:
the three-dimensional shape generating apparatus further comprises:
a shape comparator configured to compare a pre-machining shape which is the three-dimensional shape generated by the shape generator before machining the workpiece and a post-machining shape which is the three-dimensional shape generated by the shape generator after machining the workpiece;
a state estimator configured to estimate a state of the tool after machining, based on comparison result from the shape comparator; and
a notifier configured to give notice of the state estimated by the state estimator.

3. The machining system according to claim 1, wherein:
when the three-dimensional shape cannot be generated, the shape generator retries to generate the three-dimensional shape, based on a second relative distance different from the first relative distance, and the first image and the second image captured by the image capture unit respectively at the first relative position and the second relative position, the first relative position and the second relative position being spaced from each other by the second relative distance.

4. The machining system according to claim 1, wherein:
the machining system includes a plurality of the machine tools; and
the three-dimensional shape generating apparatus is configured to generate a three-dimensional shape of part of each of the machine tools.

5. The machining system according to claim 1, wherein the three-dimensional shape generating apparatus is a control device of the machine tool.

6. A machining system including a machine tool and a three-dimensional shape generating apparatus configured to generate a three-dimensional shape of part of the machine tool, wherein,
the machine tool comprises:
a spindle to which a tool is attached;
a table configured to support a workpiece;
a motor configured to drive a moving mechanism configured to move the spindle and the table; and
a camera configured to move together with the table relative to the spindle so as to take an image of the spindle side,
the three-dimensional shape generating apparatus comprises:
an image capture unit configured to capture a first image from the camera when a relative position of the table relative to the spindle is at a first relative position, and capture a second image from the camera when the relative position is at a second relative position different from the first relative position;
a shape generator configured to generate a three-dimensional shape of at least the tool, based on the first image, the second image and a first relative distance between the first relative position and the second relative position;
a shape comparator configured to compare a pre-machining shape which is the three-dimensional shape generated by the shape generator before machining the workpiece and a post-machining shape which is the three-dimensional shape generated by the shape generator after machining the workpiece;
a state estimator configured to estimate a state of the tool after machining, based on comparison result from the shape comparator; and
a notifier configured to give notice of the state estimated by the state estimator,
wherein:
the state estimator is configured to estimate that chip is attached to the tool if a portion which was not present on the pre-machining shape of the tool appears on the post-machining shape of the tool, and to estimate that the tool has worn down if a portion that was present on the pre-machining shape of the tool has disappeared from the post-machining shape of the tool.

7. The machining system according to claim 6, wherein:
when the three-dimensional shape cannot be generated, the shape generator retries to generate the three-dimensional shape, based on a second relative distance different from the first relative distance, and the first image and the second image captured by the image capture unit respectively at the first relative position and the second relative position, the first relative position and the second relative position being spaced from each other by the second relative distance.

8. The machining system according to claim 6, wherein:
the machining system includes a plurality of the machine tools; and
the three-dimensional shape generating apparatus is configured to generate a three-dimensional shape of part of each of the machine tools.

9. The machining system according to claim 6, wherein the three-dimensional shape generating apparatus is a control device of the machine tool.

10. A machining system including a machine tool and a three-dimensional shape generating apparatus configured to generate a three-dimensional shape of part of the machine tool, wherein,
the machine tool comprises:
a spindle to which a tool is attached;
a table configured to support a workpiece;
a motor configured to drive a moving mechanism configured to move the spindle and the table; and
a camera configured to move together with the table relative to the spindle so as to take an image of the spindle side,
the three-dimensional shape generating apparatus comprises:
an image capture unit configured to capture a first image from the camera when a relative position of the table relative to the spindle is at a first relative position, and capture a second image from the camera when the relative position is at a second relative position different from the first relative position;

a shape generator configured to generate a three-dimensional shape of at least the workpiece, based on the first image, the second image and a first relative distance between the first relative position and the second relative position;

a shape comparator configured to compare a pre-machining shape which is the three-dimensional shape generated by the shape generator before machining the workpiece and a post-machining shape which is the three-dimensional shape generated by the shape generator after machining the workpiece;

a state estimator configured to estimate a state of the workpiece after machining, based on comparison result from the shape comparator; and a notifier configured to give notice of the state estimated by the state estimator, wherein:

the state estimator is configured to estimate that chip is attached to the workpiece if a portion which was not present on the pre-machining shape of the workpiece appears on the post-machining shape of the workpiece, and configured to, if a portion that was present on the pre-machining shape of the workpiece has disappeared from the post-machining shape of the workpiece, estimate that the disappeared portion is a cutoff portion.

11. The machining system according to claim 10, wherein:

when the three-dimensional shape cannot be generated, the shape generator retries to generate the three-dimensional shape, based on a second relative distance different from the first relative distance, and the first image and the second image captured by the image capture unit respectively at the first relative position and the second relative position, the first relative position and the second relative position being spaced from each other by the second relative distance.

12. The machining system according to claim 10, wherein:

the machining system includes a plurality of the machine tools; and the three-dimensional shape generating apparatus is configured to generate a three-dimensional shape of part of each of the machine tools.

13. The machining system according to claim 10, wherein the three-dimensional shape generating apparatus is a control device of the machine tool.

* * * * *